(12) United States Patent
Baney et al.

(10) Patent No.: US 6,549,701 B1
(45) Date of Patent: Apr. 15, 2003

(54) SELECTABLE WAVELENGTH CHANNEL FILTER FOR OPTICAL WDM SYSTEMS

(75) Inventors: Douglas M. Baney, Los Altos, CA (US); Wayne V. Sorin, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 508 days.

(21) Appl. No.: 09/014,148

(22) Filed: Jan. 27, 1998

(51) Int. Cl.[7] .................................................. G02B 6/26
(52) U.S. Cl. .............................. 385/27; 385/31; 385/37
(58) Field of Search ............................. 385/10, 27, 31, 385/37, 24, 47

(56) References Cited

U.S. PATENT DOCUMENTS

| | | | | |
|---|---|---|---|---|
| 5,283,686 A | * | 2/1994 | Huber | 385/10 |
| 5,446,809 A | | 8/1995 | Fritz et al. | 385/17 |
| 5,542,010 A | | 7/1996 | Glance et al. | 385/14 |
| 5,572,357 A | * | 11/1996 | Nakazato et al. | 359/341 |
| 5,579,143 A | | 11/1996 | Huber | 359/130 |
| 5,608,825 A | * | 3/1997 | Ip | 385/24 |
| 5,699,468 A | * | 12/1997 | Farries et al. | 385/140 |
| 5,706,375 A | * | 1/1998 | Mihailov et al. | 385/24 |
| 5,726,785 A | * | 3/1998 | Chawki et al. | 359/130 |
| 5,774,606 A | * | 6/1998 | De Barros et al. | 385/24 |
| 5,841,918 A | * | 11/1998 | Li | 385/24 |

FOREIGN PATENT DOCUMENTS

| | | | | |
|---|---|---|---|---|
| EP | 0 665 874 A2 | 5/1995 | | H04Q/11/00 |

* cited by examiner

*Primary Examiner*—Rodney Bovernick
*Assistant Examiner*—Juliana K. Kang

(57) ABSTRACT

A filter for generating an output light signal having one or more output spectral lines selected from a plurality of potential spectral lines contained in an input light signal. The filter includes a channel filter for filtering the input light signal to create a notched light signal having a spectrum devoid of light at a first wavelength. The filter also includes a variable wavelength reflector for reflecting light having a wavelength equal to a reflection wavelength, the reflection wavelength being selectable from the first wavelength and a second wavelength equal to the wavelength of one of the spectral lines. The output of the channel filter is coupled to the input of the variable wavelength reflector. The output of the variable wavelength reflector includes the output light signal. The channel filter can be constructed using a number of known optical components such as fiber Bragg reflectors, array waveguide filters, Mach Zehnder filters, or absorption filters. The variable frequency reflector is preferably constructed from one or more variable frequency fiber Bragg reflectors.

14 Claims, 4 Drawing Sheets

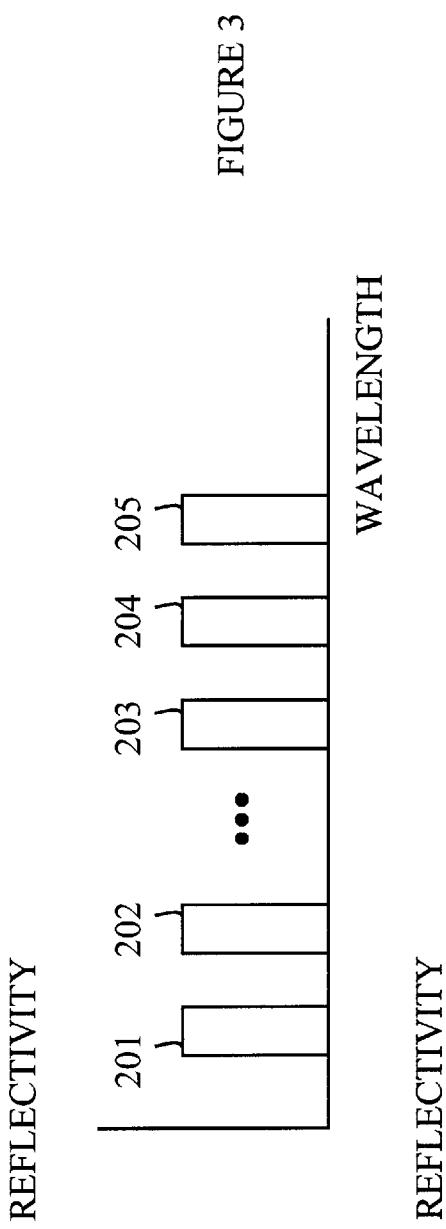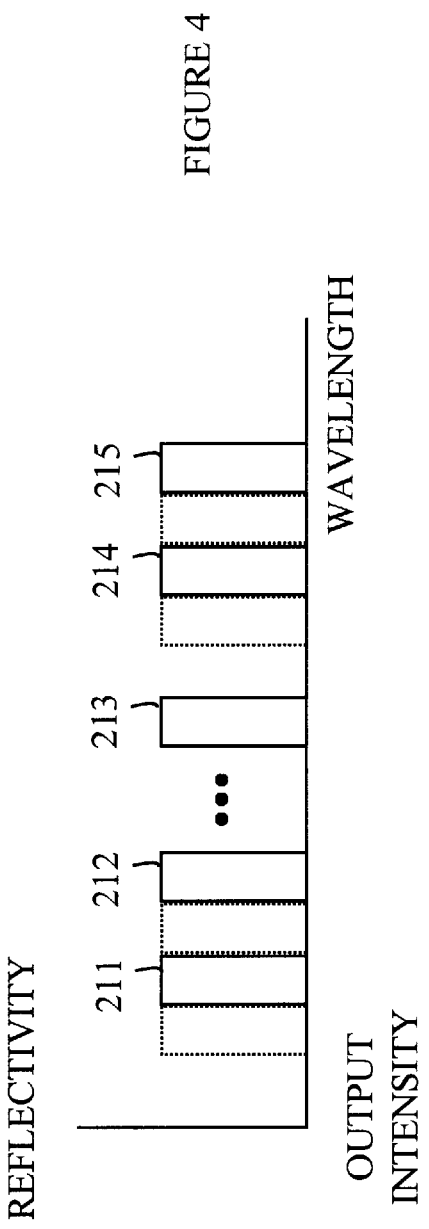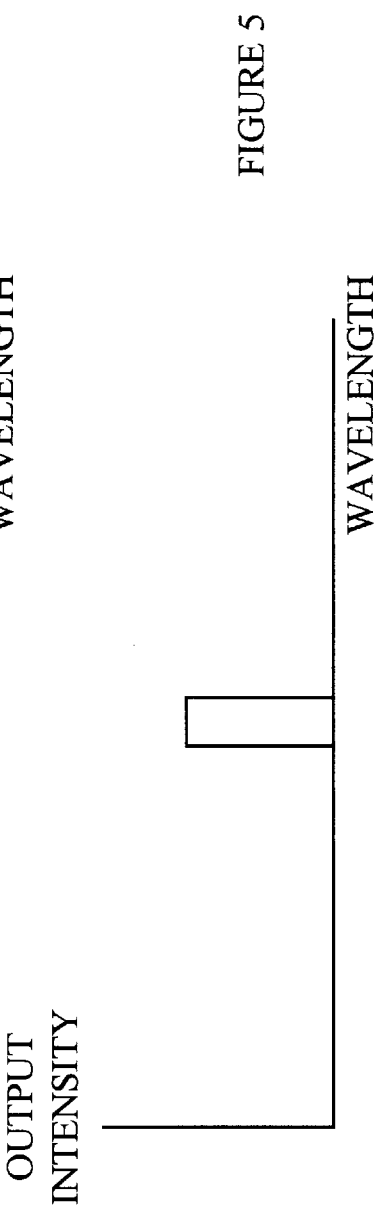

SELECTABLE WAVELENGTH CHANNEL FILTER FOR OPTICAL WDM SYSTEMS

FIELD OF THE INVENTION

The present invention relates to optical communication systems, and more particularly, to an apparatus having one or more narrow band, selectable output wavelengths.

BACKGROUND OF THE INVENTION

Communication transmission systems based on the modulation of a light signal provide substantially higher bandwidth than systems based on metallic conductors. For example, fiber optic cables are replacing coaxial cable in applications requiring high bandwidth. The capacity of an optical fiber may be further enhanced by multiplexing a number of communication channels on the same fiber utilizing light sources of different wavelengths. In such an arrangement, a number of closely spaced optical channels are transmitted on a single fiber. Each channel carries a separate data stream. Since the wavelengths of the carriers are different, the data streams do not interfere with each other and can simultaneously propagate along a single optical fiber.

The maximum number of channels is typically determined by the width of the individual channels and the maximum range of wavelengths that can be amplified by repeaters on the fiber. The channel widths and interchannel gaps are determined by the width of the spectrum generated by the light source that provides the carriers for the channels. The distance between individual channels is ultimately set by the width of the modulated spectrum on each of the optical carriers in the individual channels.

In many systems some form of gain element must be utilized to amplify the light signals in the fiber in order to compensate for transmission losses. Optical amplifiers are utilized for this function. To minimize distortions, the gain as a function of wavelength for these amplifiers needs to be constant. This condition will only be satisfied for some limited portion of the optical spectrum for any given amplifier design. Accordingly, there is a maximum number of channels imposed by the amplifiers for any given channel spacing. Hence, narrow band sources and filters are needed.

Typically, a narrow band light source is needed for each channel. Data is transmitted on any given channel by modulating the output of the light source for that channel and then introducing the modulated light into the optical fiber. Ideally, the light source should be capable of generating the carrier for any channel, the precise wavelength generated at any given time being selectable by a signal applied to the light source. Light sources having fixed output wavelengths and sufficiently narrow wavelength spreads are known to the art. For example, U.S. Pat. No. 5,268,910 describes a superluminescent optical source for generating an optical carrier from a doped fiber.

In principle, a number of such sources may be combined to provide the requisite WDM signal. However, such a compound source is cumbersome and expensive. Accordingly, it would be advantageous to provide a wavelength selectable source that is less expensive for driving a selected channel in a wavelength division multiplexed (WDM) optical transmission system.

Broadly, it is the object of the present invention to provide an improved filter arrangement for use in optical communication systems.

It is a further object of the present invention to provide a filter arrangement in which the selected wavelength can be controlled by an external signal applied to the filter.

It is a still further object of the present invention to provide a filter arrangement which may be utilized to provide a light source having a narrow band output with a center frequency that is selectable over a range of wavelengths.

These and other objects of the present invention will become apparent to those skilled in the art from the following detailed description of the invention and the accompanying drawings.

SUMMARY OF THE INVENTION

The present invention is a filter for generating an output light signal having one or more output spectral lines selected from a plurality of potential spectral lines contained in an input light signal. The filter includes a channel filter for filtering the input light signal to create a notched light signal having a spectrum devoid of light at a first wavelength. The filter also includes a variable wavelength reflector for reflecting light having a wavelength equal to a reflection wavelength, the reflection wavelength being selectable from the first wavelength and a second wavelength equal to the wavelength of one of the spectral lines. The output of the channel filter is coupled to the input of the variable wavelength reflector. The output of the variable wavelength reflector includes the output light signal. The channel filter can be constructed using a number of known optical components such as fiber Bragg reflectors, array waveguide filters, Mach Zehnder filters, or absorption filters. The variable frequency reflector is preferably constructed from one or more variable frequency fiber Bragg reflectors.

BRIEF DESCRIPTION OF THE INVENTION

FIGS. 3 and 4 illustrate the reflectivity as a function of wavelength for the reflector banks shown in FIG. 2.

FIG. 5 illustrates the output of the filter shown in FIG. 2.

DETAILED DESCRIPTION OF THE INVENTION

Figure 1:
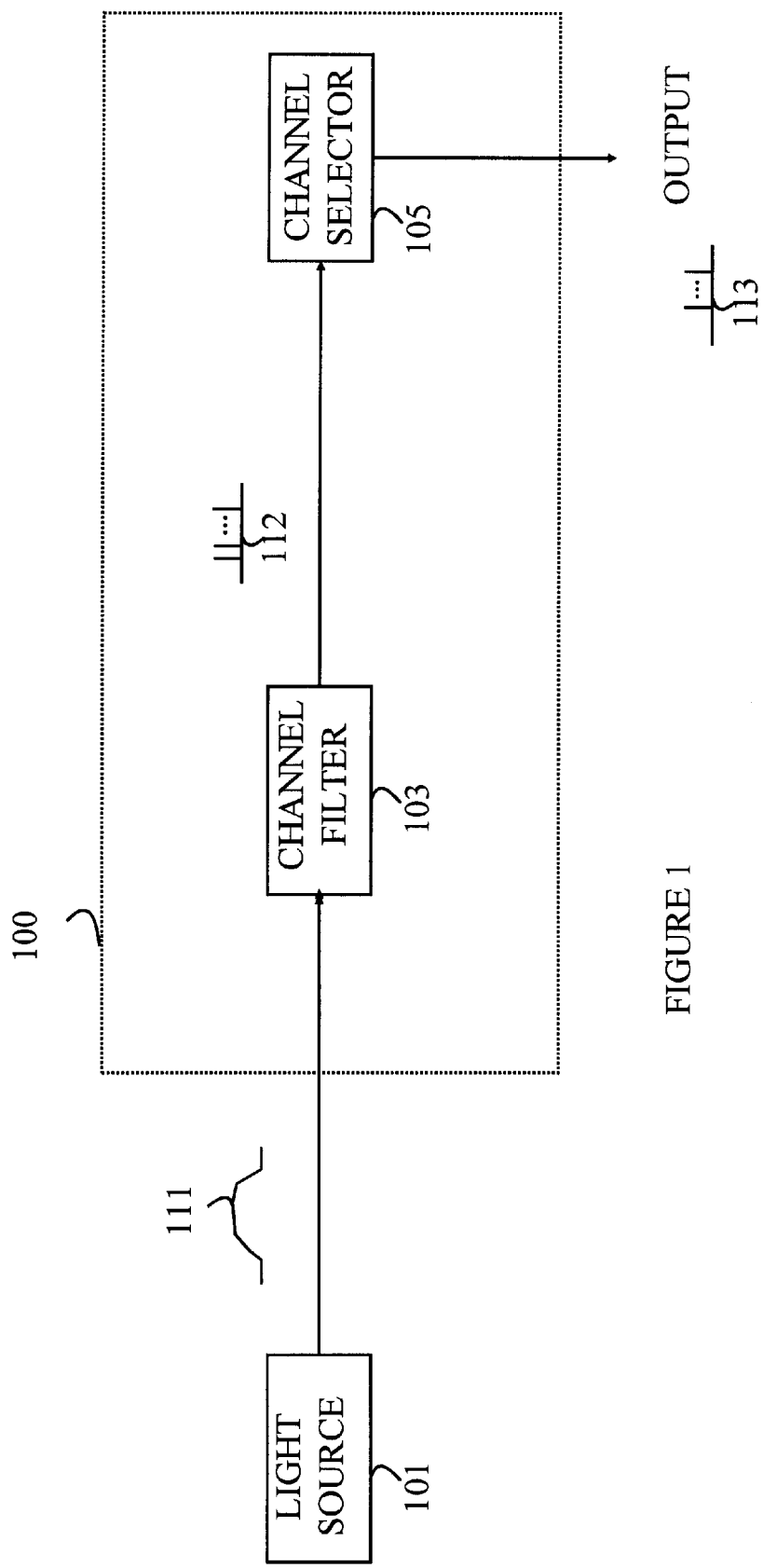
FIG. 1 is a block diagram of a filter according to the present invention.

The present invention may be viewed as an optical filter for separating light of one or more wavelengths from a broadband source having a plurality of wavelengths including the desired wavelength. The manner in which the present invention operates may be more easily understood with reference to FIG. 1, which is a block diagram of a filter 100 according to the present invention. Filter 100 takes the output 111 of a broad-spectrum light source 101 and converts it to a signal 113 having one or more discrete spectral lines at selected wavelengths.

The output of light source 101 is applied to a channel filter 103. The output of channel filter 103 is a signal having a spectrum comprising a series of discrete spectral lines as shown at 112. This spectrum includes the spectral lines that are to be included in the output signal 113 as well as a number of lines or spectral regions that are not to be included in the output signal.

The output of channel filter 103 is applied to a channel selector 105. Channel selector 105 separates the desired spectral lines from the output of channel filter 103 to generate the output signal 113.

Channel filter 103 can be constructed from any device that will isolate the desired output lines. For example, channel filter 103 may be constructed from a series of fiber Bragg reflectors and an appropriate routing device or an array waveguide filter. Since fiber Bragg reflectors are well known to the art, they will not be discussed in detail here. For the purpose of the present discussion, it is sufficient to note that a fiber Bragg reflector may be viewed as a grating that has been induced in the core of an optical fiber. The grating consist of periodic alterations in the index of refraction of the core of the fiber. Such alterations may be induced by illuminating the core with an UV light pattern having regularly spaced maxima of sufficient intensity to damage the core. The pattern is typically generated by the interference of two UV light beams.

When light having a wavelength twice the spacing of the grating strikes the grating, the light is reflected because of the coherent interference of the various partial reflections created by the alterations in the index of refraction of the fiber core. The wavelength at which the reflection occurs may be varied over a small range of wavelengths by varying the optical path length between the periodic alterations in the index of refraction. This may be accomplished by heating the fiber or by stretching the fiber. A fiber Bragg reflector which accepts an input signal which activates a heating or stretching system associated with the reflector will be referred to as a variable frequency Bragg reflector (VFBR) in the following discussion. The input signal used to activate the heating or stretching system is not shown in the following figures to simplify the figures; however, it is to be understood that each VFBR includes a signal input and the appropriate hardware for altering the reflection wavelength.

Figure 2:
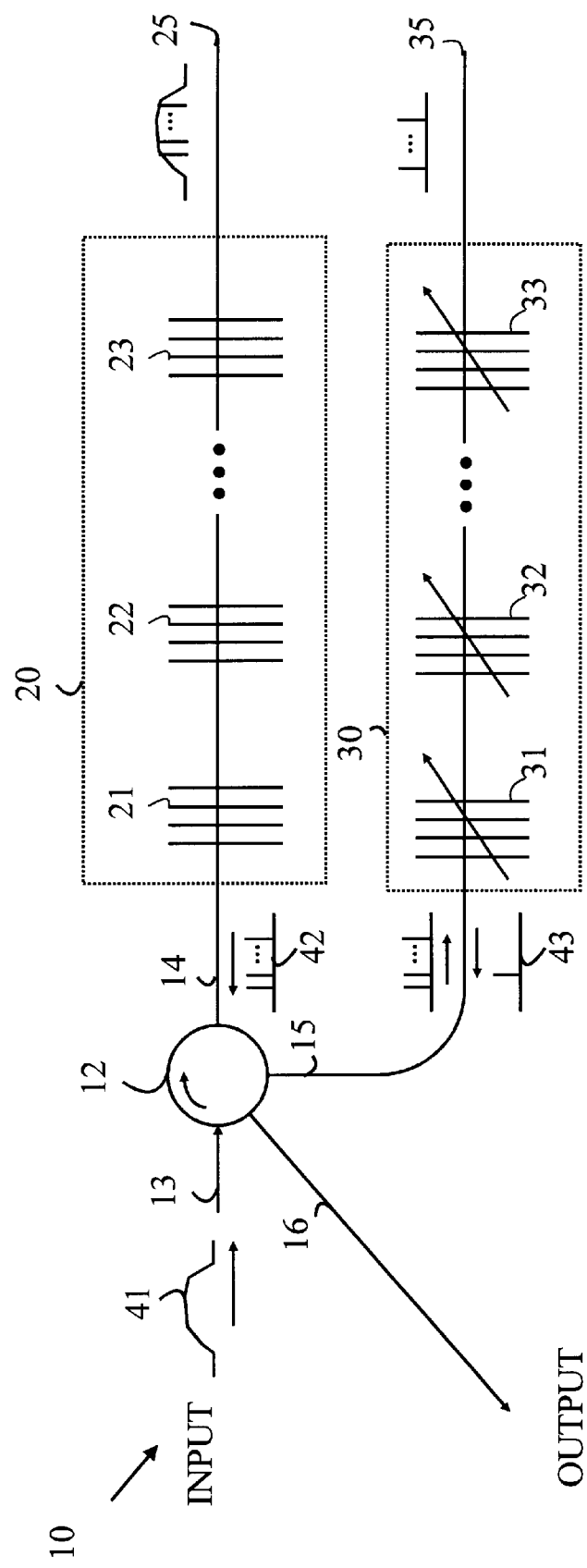
FIG. 2 is a schematic drawing of a filter according to the present invention that utilizes a reflector bank as the channel filter.

The manner in which Bragg reflectors may be utilized to implement both the channel filter and channel selector may be more easily understood with reference to FIG. 2 which is a schematic drawing of a filter 10 according to the present invention. Filter 10 is constructed from an optical circulator 12 and two banks of optical Bragg reflectors shown at 20 and 30, respectively. Bank 20 acts as the channel filter, and bank 30 acts as the channel selector. Optical circulator 12 provides the coupling functions.

For the purposes of the present discussion, an optical circulator is a device having a plurality of ports and a defined direction of travel indicated by the arrow. Light entering any port travels in the direction of the arrow until it reaches the next port in that direction at which it exits. Hence, light entering port 13 of optical circulator 12 exits via port 14. Light entering port 14 will exit via port 15. Similarly, light entering port 15 will exit via port 16. Optical circulators may be purchased commercially, and hence, the detailed construction of optical circulators will not be discussed in detail here.

Reflector bank 20 includes one fiber Bragg reflector for each wavelength that is to be included in the output of the channel filter. Exemplary reflectors are shown at 21–23. Denote the number of such reflectors by N. The output of reflector bank 20 is an optical signal having a spectrum that consists of N lines. Each line is generated by one of the Bragg reflectors in bank 20. The light that is not reflected is either discarded or transmitted for additional use.

The channel selection function is performed by a reflector bank 30, which is constructed from a plurality of VFBRs. Exemplary VFBRs are shown at 31–33. The number of VFBRs must be at least as the number of spectral lines that are to be included in the output of the filter 10. Each line that is to appear in the output signal is generated by a reflection from a corresponding VFBR in reflector bank 30. If only one line was ever required, then only one VFBR would be needed. Such an embodiment will function properly provided the reflection wavelength of that VFBR could be varied sufficiently to cover the entire spectral range of the input signal to reflector bank 30 so that the desired spectral line could be selected by moving the reflection wavelength to the line's wavelength.

Unfortunately, the degree of variation in the reflection wavelength that can be obtained by heating or stretching an optical fiber Bragg reflector is limited. As noted above, in a typical wavelength division multiplexed optical network, the channels have closely spaced wavelengths. The spacing between any two channels is sufficient to provide channel isolation. However, the total wavelength range across all of the channels is preferably kept to a minimum to allow a single optical amplifier to be used to maintain the signal strength in the network at each amplification station. In general, the degree of variation in the reflection wavelength of the VFBR is sufficient to move the reflection wavelength from a value between two channels to a value on one of the adjacent channels. Hence, the light in a single channel can be selectively reflected by heating or stretching a corresponding VFBR to move its reflection wavelength from a value between two channels to the channel value.

Accordingly, the preferred embodiment of the present invention utilizes one VFBR in reflector bank 30 for each Bragg reflector in reflector bank 20. This arrangement assures that each spectral line that is generated by reflector bank 20 can be included in the output signal. Furthermore, all of the spectral lines, or any subset thereof, can be included in the output signal. When any specific spectral line is not to be sorted into the output signal, the corresponding VFBR has its reflection wavelength set to a value between two channels. Since there is no light in this spectral region, the VFBR will not provide any light to the output signal when "parked" in this manner.

The manner in which filter 10 extracts a particular wavelength from a broadband input light signal will now be summarized. The input light signal 41 enters optical circulator 12 at port 13 and exits via port 14 into reflector bank 20. The reflectivity of filter 10 as a function of wavelength is shown in FIG. 3. There is one reflector in filter 10 for each possible output line. The reflectivity of representative reflectors is shown at 201–205. Reflector bank 20 converts the broad input spectrum to a spectrum consisting of N discrete lines as shown at 42, each line being generated by a reflection from one of the reflectors in filter 10. One of these lines corresponds to the desired output wavelength. The remainder of the input signal is transmitted to fiber 25.

The output of reflector bank 20 is reflected back to optical circulator 12. This light signal exits optical circulator 12 on port 15 and forms the input to reflector bank 30 whose reflectivity as a function of wavelength is shown in FIG. 4. In the preferred embodiment of the present invention, there is one reflector in reflector bank 30 for each reflector in reflector bank 20. The reflectivity functions of the reflectors in filter 20 corresponding to reflectors that generated reflectivities 201–205 shown in FIG. 3 are shown at 211–215, respectively, in FIG. 4. When not used to select a line from the output of reflector bank 20, each filter is parked at a wavelength between two of the wavelengths at which reflector bank 20 reflects. The wavelengths of the lines generated by filter 10 are shown as dotted lines in FIG. 4. The parked reflectors are shown at 211–212 and 214–215. Reflector bank 30 selects the line corresponding to the desired wavelength from the N discrete line input spectrum. This is accomplished by moving the reflection wavelength of a VFBR in reflector bank 30 from a value between two of the spectral lines generated by reflector bank 20 to the wavelength of the desired line as shown at 213 in FIG. 4. The remaining VFBRs do not reflect light, and hence, the unselected spectral lines exit reflector bank 30 and are transmitted to fiber 35.

The light reflected by reflector bank 30 re-enters circulator 12 at port 15. This fight exits circulator 12 on port 16 and becomes the output signal. In the example shown in FIGS. 3 and 4, the selected spectrum consists of the single line shown in FIG. 5 which corresponds to the wavelength at which both reflector banks reflect light.

It should be noted that filter 10 can be operated to generate an output consisting of any subset of the N spectral lines generated by reflector bank 20. A multi-line spectrum is useful in optical networks in which signals are switched between linked communication paths based on the wavelength of the carrier. By modulating a multi-line source, a light signal can be broadcast to many linked communication paths. For each desired output wavelength, the reflection wavelength of one of the VFBRs in reflector bank 30 is set to match the wavelength of the input spectral line generated by reflector bank 20.

The above discussion assumed that the reflectors in reflector bank 20 were at fixed wavelengths. However, embodiments in which these reflectors are also VFBRs may also be constructed. The ability to move the lines from which the output spectrum is chosen provides additional flexibility in selecting the output spectrum.

Figure 6:
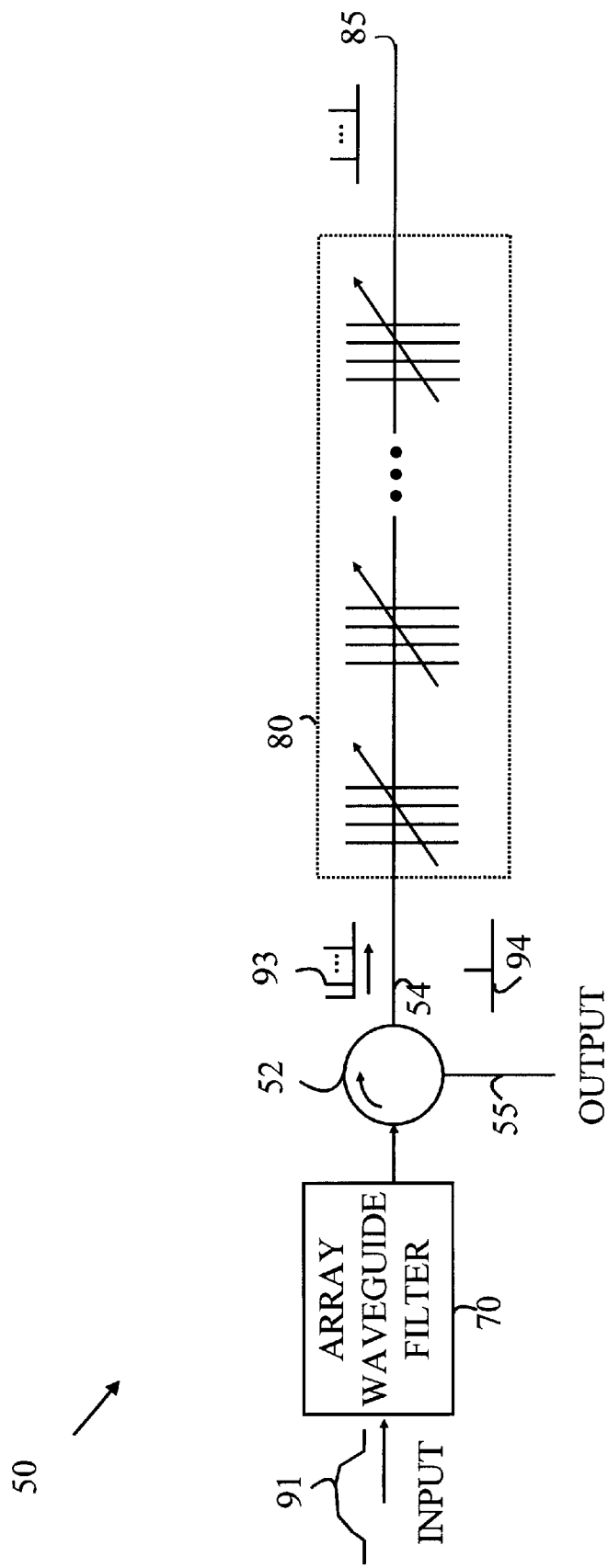
FIG. 6 is a schematic drawing of a filter according to the present invention that utilizes a tapered fiber filter as the channel filter.

As noted above, the channel filter may also be constructed from an array waveguide filter as shown in FIG. 6. This filter is constructed by splitting the optical signal onto multiple planar waveguides, each having a well defined optical delay. The multiple waveguides are then combined to create a single output whose filtering characteristics depend on the optical delays and the distribution of powers on the multiple waveguides. For the purposes of the present discussion, it is sufficient to note that an array waveguide filter can generate a spectrum consisting of regularly spaced spectral bands similar to those generated by reflector bank 20 in FIG. 2. The channel filter can also be constructed using other types of periodic transmission filters such as Mach Zehnder interferometers, Fabry-Perot filters and tapered fiber filters.

A schematic drawing of an embodiment 50 of a filter according to the present invention that utilizes an array waveguide filter is shown in FIG. 6. A broad band input signal is filtered by a tapered fiber filter 70 to generate an output signal 93 which is coupled to a VFBR bank 80 by an optical circulator 52. Bank 80 operates in a manner analogous to reflector bank 30 as discussed above. There is one VFBR in bank 80 for each spectral line that is to be included in the output signal. When a VFBR is not being used to reflect light into the output signal, its reflection wavelength is adjusted to a value between two of the spectral bands generated by tapered fiber filter 70. Light that is not reflected by reflector bank 80 is transmitted to fiber 85. The light that is reflected by bank 80 re-enters optical circulator 52 via port 54 and exits via port 55 to become the output signal.

It should be noted that the width of the spectral lines in the output spectrum in both of the embodiments discussed above may be set by the VFBRs in the channel selector banks, i.e., banks 30 and 80 shown in FIGS. 2 and 6, respectively. Hence, the channel filter need only generate a spectrum which has narrow empty bands at the wavelengths where VFBRs are "parked" when not being used to generate a contribution to the output spectrum. Accordingly, any form of "notch" filter for removing a band corresponding to each of the VFBRs can be utilized. For example, a number of absorption filters connected in series can provide the required spectrum.

While the above embodiments of the present invention have utilized optical circulators for the coupling functions, it will be apparent to those skilled in the art that other forms of couplers may be utilized. For example, the optical circulators could be replaced by conventional optical directional couplers, which are normally utilized for coupling light between two optical fibers.

Various modifications to the present invention will become apparent to those skilled in the art from the foregoing description and accompanying drawings. Accordingly, the present invention is to be limited solely by the scope of the following claims.

What is claimed is:

1. A filter for generating an output light signal having one or more output spectral lines selected from a plurality of potential spectral lines included in an input light signal, said filter comprising:

a channel filter for filtering said input light signal to create a notched light signal having a spectrum devoid of light at a first wavelength; and a variable wavelength reflector connected to said channel filter for reflecting a portion of the light leaving said channel filter, said reflected light having a wavelength equal to a reflection wavelength, said variable wavelength reflector switching said reflection wavelength from said first wavelength to a second wavelength equal to the wavelength of one of said potential spectral lines.

2. The filter of claim 1 wherein said channel filter comprises a periodic transmission filter.

3. The filter of claim 1 wherein said channel filter comprises a fiber Bragg reflector.

4. The filter of claim 1 wherein said channel filter comprises an array waveguide filter.

5. The filter of claim 1 wherein said variable wavelength reflector comprises a variable frequency fiber Bragg reflector.

6. The filter of claim 1 wherein said variable wavelength reflector comprises a plurality of variable frequency fiber Bragg reflectors, each variable frequency fiber Bragg reflector corresponding to one of said potential spectral lines in said output signal, and wherein said channel filter generates a different spectral region devoid of light for each one of said variable frequency fiber Bragg reflectors.

7. The filter of claim 1 further comprising an optical circulator for connecting said channel filter to said variable wavelength reflector and for collecting light reflected by said variable wavelength reflector to form said output light signal.

8. An optical source comprising:

an input light source that generates a light signal having a continuous spectrum between a minimum and maximum wavelength;

a channel filter for filtering said input light signal to create a notched light signal having a spectrum comprising a plurality of spectral lines with wavelengths between said minimum and maximum wavelength, each pair of spectral lines being separated by a notched region devoid of light;

a variable wavelength reflector connected to said channel filter for reflecting light having a reflection wavelength, said variable wavelength reflector switching said reflection wavelength from a wavelength in one of said notched regions to a wavelength equal to the wavelength of one of said spectral lines.

9. The optical source of claim 8 wherein said channel filter comprises a periodic transmission filter.

10. The optical source of claim 8 wherein said channel filter comprises a fiber Bragg reflector.

11. The optical source of claim 8 wherein said channel filter comprises an array waveguide filter.

12. The optical source of claim 8 wherein said variable wavelength reflector comprises a variable frequency fiber Bragg reflector.

13. The optical source of claim 8 wherein said variable wavelength reflector comprises a plurality of variable frequency fiber Bragg reflectors, each variable frequency fiber Bragg reflector corresponding to one of said spectral lines, and wherein said channel filter generates one spectral region devoid of light for each one of said variable frequency fiber Bragg reflectors.

14. The optical source of claim 8 further comprising an optical circulator for connecting said channel filter to said variable wavelength reflector and for collecting light reflected by said variable wavelength reflector to form said output light signal.

* * * * *